(12) United States Patent
Pope et al.

(10) Patent No.: US 8,021,219 B2
(45) Date of Patent: Sep. 20, 2011

(54) TOP COVER FOR AXIAL ROTARY COMBINE HAVING CONED TRANSITION

(75) Inventors: Glenn Pope, Viola, IL (US); Aaron Bruns, Davenport, IA (US)

(73) Assignee: Deere and Company, Moline, IL (US)

( * ) Notice: Subject to any disclaimer, the term of this patent is extended or adjusted under 35 U.S.C. 154(b) by 273 days.

(21) Appl. No.: 11/982,418

(22) Filed: Oct. 31, 2007

(65) Prior Publication Data

US 2009/0111546 A1    Apr. 30, 2009

(51) Int. Cl.
*A01F 12/18* (2006.01)
*A01F 7/06* (2006.01)

(52) U.S. Cl. .............................. 460/67; 460/80

(58) Field of Classification Search ........... 460/59, 460/63, 66–70, 73, 74, 79, 80, 84, 107, 108
See application file for complete search history.

(56) References Cited

U.S. PATENT DOCUMENTS

| | | | |
|---|---|---|---|
| 3,589,111 A * | 6/1971 | Gullickson et al. ............ 56/12.8 |
| 4,159,023 A | 6/1979 | Todd et al. |
| 4,266,560 A * | 5/1981 | Powell et al. .................. 460/68 |
| 4,274,426 A * | 6/1981 | Williams ........................ 460/67 |
| 4,353,376 A | 10/1982 | Schuler |
| 4,505,279 A | 3/1985 | Campbell et al. |
| 4,875,891 A | 10/1989 | Turner et al. |
| 5,112,279 A | 5/1992 | Jensen et al. |
| 5,344,367 A | 9/1994 | Gerber |
| 5,445,563 A | 8/1995 | Stickler et al. |
| 5,497,605 A | 3/1996 | Underwood et al. |
| 5,498,206 A | 3/1996 | Underwood et al. |
| 5,688,170 A | 11/1997 | Pfeiffer et al. |
| 5,803,807 A * | 9/1998 | Satzler ............................ 460/69 |
| 6,468,152 B2 | 10/2002 | Moriatry |
| 6,884,161 B2 | 4/2005 | Moriarty |
| 7,070,498 B2 | 7/2006 | Grywacheski et al. |

OTHER PUBLICATIONS

European Search Report dated Feb. 20, 2009, (6 pages).

* cited by examiner

*Primary Examiner* — Thomas B Will
*Assistant Examiner* — Joan D Misa
(74) *Attorney, Agent, or Firm* — Erickson Law Group, PC (57) ABSTRACT

A threshing and separating mechanism for a combine includes an elongated rotor mounted for rotation about a rotor axis on the combine within a rotor housing. The rotor has a threshing portion and a separating portion. The housing has a threshing section and a separating section corresponding to the threshing portion and the separating portion. The housing surrounds the rotor and is spaced from the rotor to form an annular space between the rotor and the housing for crop material to flow through in an axial crop flow direction from an inlet end of the housing to an outlet end of the housing. The housing includes a smooth transition section between the threshing section and the separating section of the housing.

20 Claims, 6 Drawing Sheets

TOP COVER FOR AXIAL ROTARY COMBINE HAVING CONED TRANSITION

FIELD OF THE INVENTION

The invention relates to rotors and housings for axial rotary agricultural combines.

BACKGROUND OF THE INVENTION

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Rotary combines have one or two large rotors for threshing and separating the harvested crop material. In most rotary combines the rotor or rotors are arranged along the longitudinal axis of the machine. These rotors are provided with an infeed section for receiving harvested crop material, a threshing section for threshing the harvested crop material received from the infeed section and a separating section for freeing grain trapped in the threshed crop material received from the threshing section.

Rotors have been provided for combines in a variety of configurations to optimize harvesting efficiency for a wide variety of crops and crop conditions. Examples are shown in U.S. Pat. Nos. 5,445,563 and 5,688,170 assigned to the assignee of the present application. These two patents both disclose rotary crop processing units having two or more sections. The relationship between the rotor axis and the housing axis varies from one section to the other. The rotor axis becomes increasingly offset from the housing axis in the crop flow direction from the housing inlet to the housing outlet. This is accomplished by abrupt transitions in the housing structure between sections where the housing shape changes. As the housing shape changes, the housing axis steps upward relative to the rotor axis and the gap between the rotor and the top of the housing increases at each step in the housing.

U.S. Pat. No. 7,070,498 describes a combine rotor having both infeed and threshing sections on a common frusto-conical portion of the rotor drum. The rotor in the infeed section is provided with helical infeed elements located on the fore-region of the frusto-conical portion of the drum. Immediately downstream from the infeed section, the threshing section is provided with a number of threshing elements. A portion of the threshing elements are attached to the aft-region of the frusto-conical portion of the drum, with the remaining portion being attached to the rearward cylindrical portion.

In such rotary combines, due to the shape and sizing of the housing covers, the rotor housing expands in steps as the material moves rearward. The first step is over the threshing area. The other expansion point is over the separator portion of the rotor. For a rotor design such as disclosed in U.S. Pat. No. 7,070,498, the annular gap defined between the top cover and the rotor tapers to a minimum at the midpoint of the threshing section. The annular gap defined between the rotor and the cover step expands again at the start of the separating section. This abrupt expansion causes excess or wasted power consumption, excess wear and straw damage without increasing threshing capacity.

The present inventors have recognized that a need exists for providing a rotor housing for an axial rotary agricultural combine that provides for efficient energy consumption, an increased wear life, and decreased threshing damage to the grain harvested.

SUMMARY OF THE INVENTION

The invention provides a threshing and separating mechanism for a combine. The mechanism includes an elongated rotor mounted for rotation about a rotor axis on the combine within a rotor housing. The rotor has a threshing portion and a separating portion. The housing has a threshing section and a separating section corresponding to the threshing portion and the separating portion. The housing surrounds the rotor and is spaced from the rotor to form an annular space between the rotor and the housing for crop material to flow through in an axial crop flow direction from an inlet end of the housing to an outlet end of the housing.

The housing has a top that is raised above the rotor to define a first distance between the top of the threshing section of the housing and the rotor axis, and a second distance between the top separating section of the housing and the rotor axis.

The housing includes a transition section between the threshing section and the separating section of the housing. The transition section is arranged over an outlet portion of the threshing portion of the rotor and an inlet portion of the separating portion of the rotor. The top of the housing is raised above the rotor at an inlet end of the transition section to define a third distance between the rotor axis and the top of the transition section. The top of the housing is raised above the rotor at an outlet end of the transition section to define a fourth distance between the rotor axis and the top of the transition section, the third distance substantially equal to the first distance and the fourth distance substantially equal to the second distance.

This configuration provides a smooth, energy-efficient, wear resistant, and crop protecting transition of crop material flow between the threshing section and the separating section of the rotor housing.

According to one embodiment, the housing has a top that is raised above the rotor to define a first gap between the top of the threshing section of the housing and the rotor, and a second gap between the top separating section of the housing and the rotor.

According to this embodiment the housing includes a transition section between the threshing section and the separating section of the housing. The transition section is arranged over an outlet portion of the threshing portion of the rotor and an inlet portion of the separating portion of the rotor. The top of the housing is raised above the rotor at an inlet end of the transition section to define a third gap between the rotor and the top of the transition section. The top of the housing is raised above the rotor at an outlet end of the transition section to define a fourth gap between the rotor and the top of the transition section, the third gap substantially equal to the first gap and the fourth gap substantially equal to the second gap.

This configuration also provides a smooth, energy-efficient, wear resistant, and crop protecting transition of crop material flow between the threshing section and the separating section of the rotor housing.

According to another embodiment, the transition section of the housing, when viewed in a vertical section along the housing axis, is frusto-conical and the gap between the rotor and the top of the housing continuously increases in the crop flow direction within the threshing section and within the separating section.

Preferably, the rotor comprises a tube, that when viewed in a vertical section along the housing axis, is frusto-conical within the threshing section.

The invention also provides an axial flow combine for harvesting, threshing and separating crop material that includes a supporting structure, wheels, tracks or the like extending from the supporting structure for transporting the supporting structure around a field, and a threshing and separating mechanism supported on the supporting structure.

The threshing and separating mechanism includes a rotor housing located inside the supporting structure. The rotor housing is provided with a threshing section in which crop material is threshed and a separating section in which threshed grain is separated from threshed crop material. A rotor is located in the rotor housing having a rotor axis, wherein the rotor is provided with crop engaging assemblies for engaging crop material passing through the rotor housing. The threshing section of the rotor housing is arranged so that the threshing axis has a first eccentricity with respect to the rotor axis and the separating section of the rotor housing is arranged so that the separating axis has a second eccentricity with respect to the rotor axis, the first eccentricityl being less than the second eccentricity. A substantially frusto-conical transition section connects the threshing section of the rotor housing to the separating section of the rotor housing.

Preferably, the rotor housing is arranged so that the separating axis is located parallel to and above the rotor axis.

Preferably, the housing separating section includes a separating grate.

The transition section of the housing lowers power consumption and increases throughput of the rotor. The coned transition top cover is at an angle similar to the rotor taper in the threshing section for increased flow with a gradual expansion to the separating section. This gradual expansion also decreases wear on the rotor and rotor housing and decreases crop damage.

Numerous other advantages and features of the present invention will be become readily apparent from the following detailed description of the invention and the embodiments thereof, and from the accompanying drawings.

DETAILED DESCRIPTION OF THE PREFERRED EMBODIMENTS

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
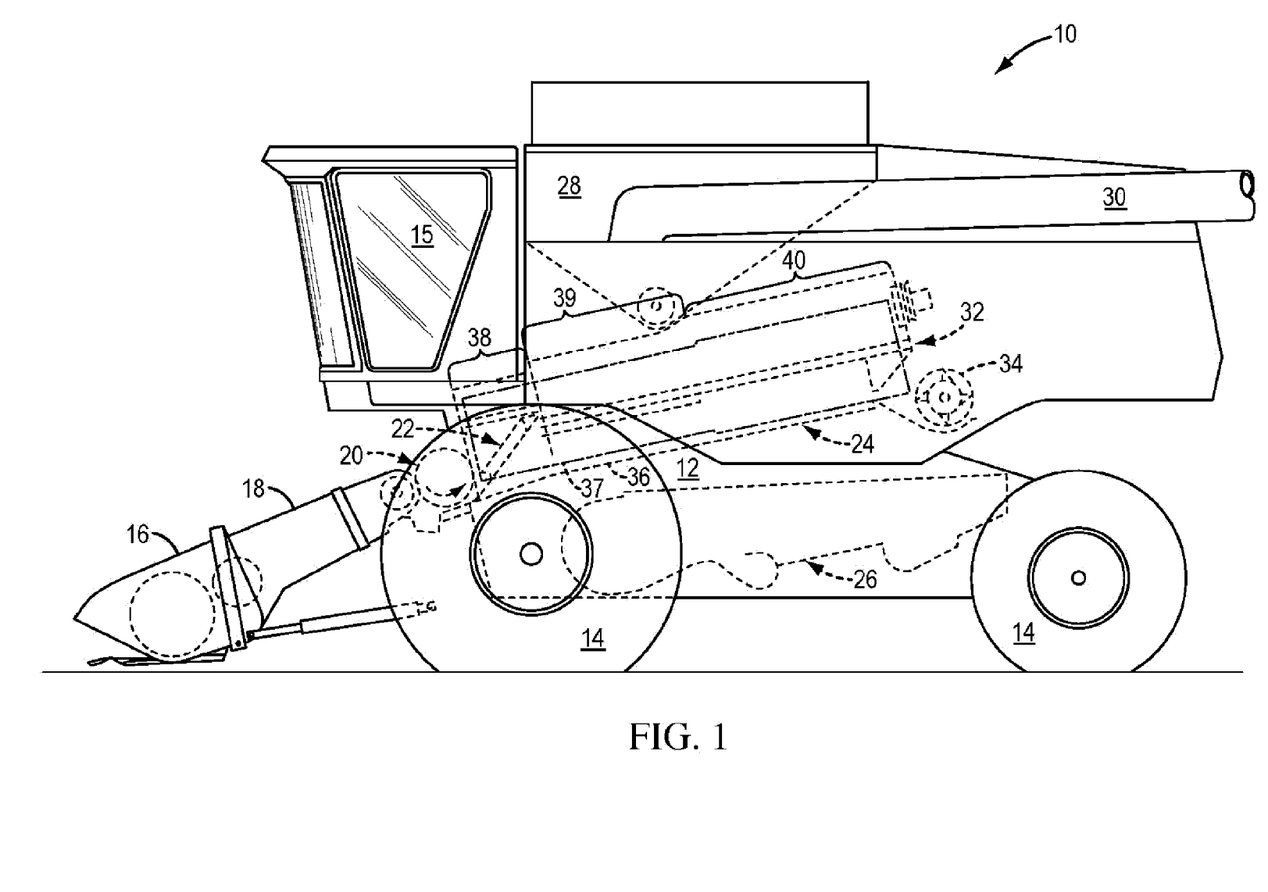
FIG. 1 is a diagrammatic side view of an agricultural combine the present invention.

FIG. 1 shows an agricultural combine 10 comprising a supporting structure 12 having ground engaging wheels 14 extending from the supporting structure. The operation of the combine is controlled from operator's cab 15. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit 24 threshes and separates the harvested crop material. Grain and chaff fall through grates on the bottom of the unit 24 to the cleaning system 26. The cleaning system 26 removes the chaff and directs the clean grain to a clean grain elevator (not shown). The clean grain elevator deposits the clean grain in grain tank 28. The clean grain in the tank 28 can be unloaded into a grain cart or truck by unloading auger 30. Threshed and separated straw is discharged from the axial crop processing unit 24 through outlet 32 to discharge beater 34. The discharge beater 34 in turn propels the straw out the rear of the combine.

Figure 2:
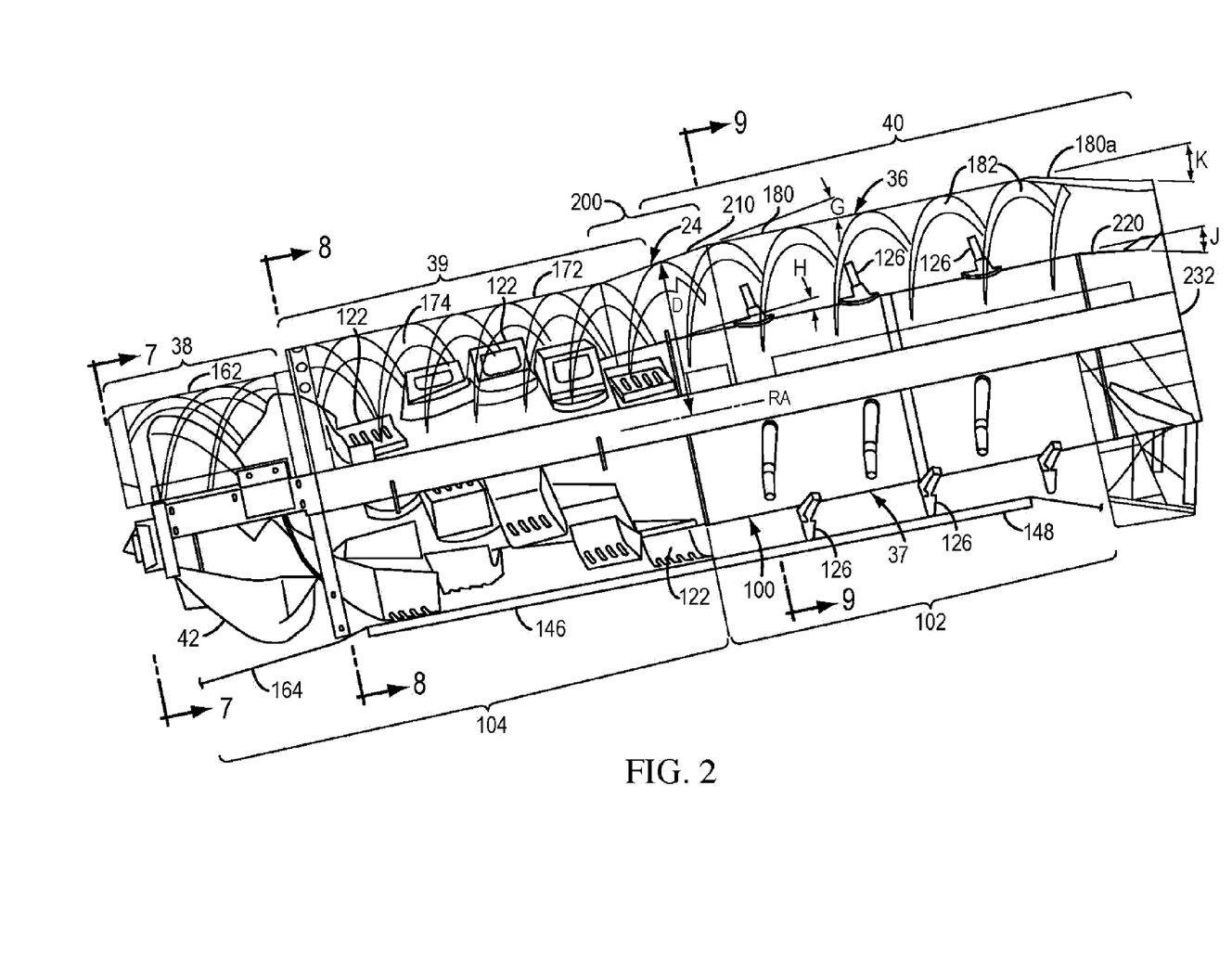
FIG. 2 is a diagrammatic side view of a crop processing unit taken from the combine shown in FIG. 1.

As illustrated in FIG. 2, the axial crop processing unit 24 comprises a rotor housing 36 and a rotor 37 located inside the housing 36. The front part of the rotor 37 and the rotor housing 36 define the infeed section 38 of the crop processing unit. Longitudinally downstream from the infeed section 38 are threshing section 39 and separating section 40. The rotor 37 comprises a drum 100 to which crop processing elements for the infeed section, threshing section, and separating section are affixed. The drum 100 comprises a rearward cylindrical portion 102 and a forwardly extending frusto-conical portion 104.

The rotor 37 shown in FIG. 2 is similar to the rotor explained in more detail in U.S. Pat. No. 7,070,498, herein incorporated by reference. However, in contrast to the rotor shown in U.S. Pat. No. 7,070,498, the rotor 37 within the threshing section 39 includes a long tapered profile throughout the threshing section 39 without the cylindrical portion within the threshing section as described in U.S. Pat. No. 7,070,498. Alternatively, the rotor could be a rotor having the shape such as shown U.S. Pat. No. 5,688,170. The invention is useful with and encompasses all of these rotors.

The rotor 37 in the infeed section 38 is provided with helical infeed elements 42 located on the frusto-conical portion of the drum 100. The helical infeed elements 42 engage harvested crop material received from the beater 20 and inlet transition section 22.

In the threshing section 39 the rotor 37 is provided with a number of threshing elements 122 for threshing the harvested crop material received from the infeed section 38.

The separating section 40 of the rotor includes outwardly projecting tines 126 similar to the tines disclosed in FIGS. 11 and 12 of U.S. Pat. No. 5,112,279, herein incorporated by reference.

The threshing section 39 of the rotor housing is provided with a concave 146 and the separating section 40 is provided with a grate 148. Grain and chaff released from the crop mat falls through the concave 146 and the grate 148. The concave and grate prevent the passage of crop material larger than grain or chaff from entering the cleaning system 26.

The rotor is axially arranged in the combine and defines a central rotor axis RA. The rotor axis RA is a straight line passing through the infeed, threshing and separating portions of the rotor.

Figures 7, 8, 9:
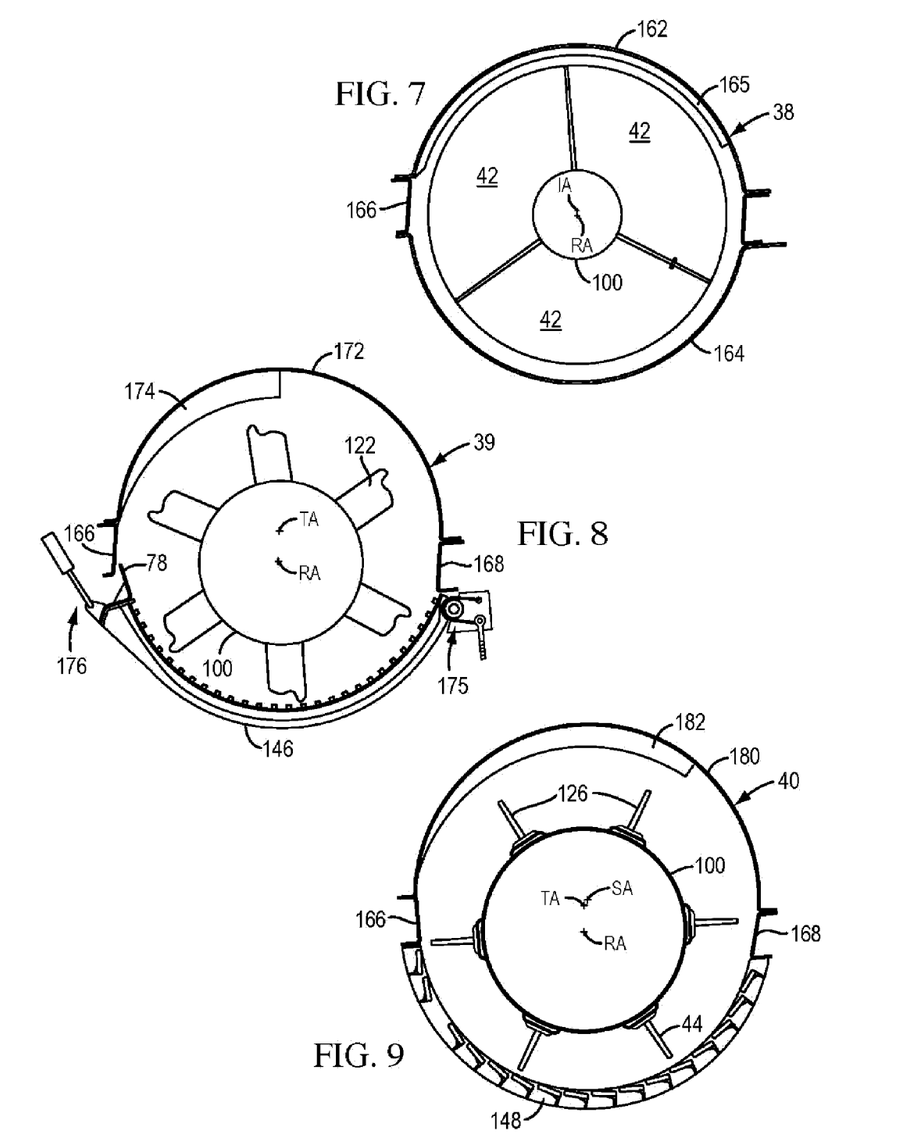
FIG. 7 is a sectional view taken generally along line 7-7 of FIG. 2.
FIG. 8 is a sectional view taken generally along line 8-8 of FIG. 2.
FIG. 9 is a sectional view taken generally along line 9-9 of FIG. 2.

As seen in FIG. 7, the infeed section 38 of the rotor housing 36 is provided with a closed cover 162 and a closed bottom 164. The cover 162 is provided with helical indexing vanes 165. The cover and bottom are bolted to axial rails 166 and 168. The forward portion of the closed bottom 164 is provided with an inlet transition section which is similar to one of those disclosed in U.S. Pat. No. 7,070,498 or U.S. Pat. No. 5,344,367, herein incorporated by reference.

The closed cover 162 of the infeed section 38 defines an infeed axis IA. The infeed axis IA is parallel to and substantially collinear with the rotor axis RA defined by the rotor. As such, the infeed portion of the rotor is substantially concentrically arranged in the infeed section 38 of the rotor housing as defined by the cover 162.

As seen in FIG. 8, the threshing section 39 is provided with a closed threshing cover 172 having helical vanes 174. The cover is bolted to axial rails 166 and 168. The concave 146 is pivotally mounted to the frame of the combine below rail 168 at 175. An adjustment assembly 176 for adjusting concave clearance is mounted to the frame of the combine below rail 166. The concave 146 is provided with a closed extension 178.

The threshing cover 172 defines a threshing axis TA that is parallel to the rotor axis RA. The threshing axis is located above the rotor axis RA. In addition, the threshing axis is slightly offset to the side of the rotor axis in a downstream direction. As such, the cover of the threshing section is eccentrically arranged relative to the threshing portion of the rotor.

The separating section 40 is provided with a separating cover 180 having helical vanes 182. The cover is bolted to axial rails 166 and 168. Grate 148 is also bolted to rails 166 and 168. Grate 148 is similar to the grate disclosed in U.S. Pat. No. 4,875,891.

The separating cover 180 defines a separating axis SA that is parallel to the rotor axis RA. The separating axis is located above the rotor axis RA. In addition, the separating axis is offset to the side of the rotor axis in a downstream direction. As such, the cover of the separating section is eccentrically arranged relative to the separating portion of the rotor.

According to the preferred embodiment of the present invention, a frusto-conical transition section 200 is provided between the threshing section 39 and the separating section 40, overlapping each section.

The transition section 200 includes a cover 210 having a substantially frusto-conical curvature. The cover 210 includes vanes 214a, 214b. The vane 214a has a relatively wide width similar to the vanes 174 of the threshing section 39. The vane 214a is substantially continuous with the last vane 182a of the separating section 40. The vane 214b has a relatively wide width section 214c similar to the width of the vane 174 of the threshing section 39, and a relatively thinner width section 214d similar to the width of the vane 182 of the separating section 40.

Preferably, for smooth, energy-efficient flow, the cover 210 has a taper angle "G" that is substantially equal to a taper angle "H" of the rotor drum 100 within the threshing section 39 for the rotor shown in FIG. 2.

Some rotors provided a further, reverse taper portion 220 of the rotor drum 100 at an outlet end of the processing unit 24 having an angle of taper "J." A deflecting plate 180a in the separator cover 180 can be arranged over the reverse taper portion 220 to provide for a smooth, energy-efficient flow of crop material. Preferably the deflecting plate taper angle "K" is preferably substantially equal to the rotor angle "J."

Figure 2A:
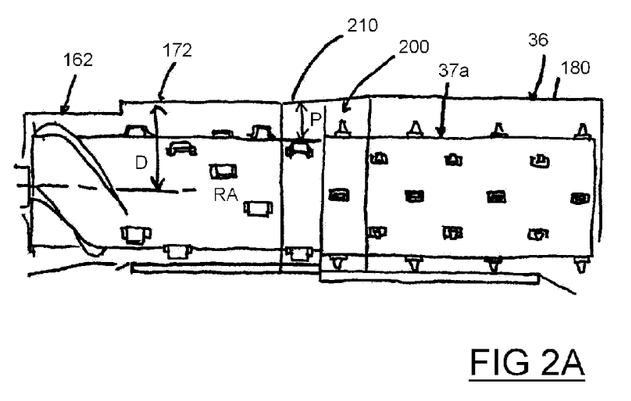
FIG. 2A is a diagrammatic side view of a crop processing unit taken from the combine shown in FIG. 1 with an alternate rotor.
Figure 2B:
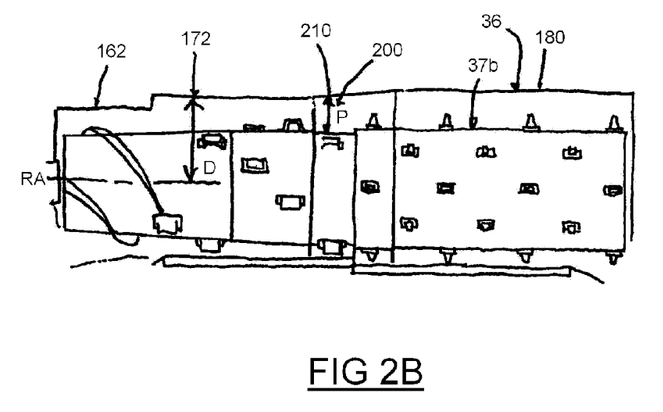
FIG. 2B is a diagrammatic side view of a crop processing unit taken from the combine shown in FIG. 1 with a further alternate rotor.
Figure 3:
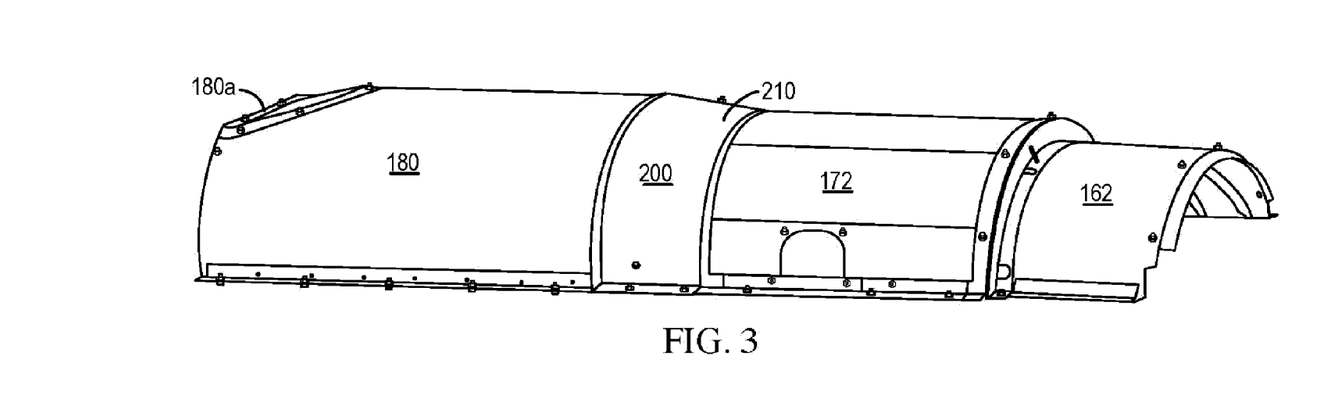
FIG. 3 is a perspective view of a cover for a crop processing unit of FIG. 2.
Figure 4:
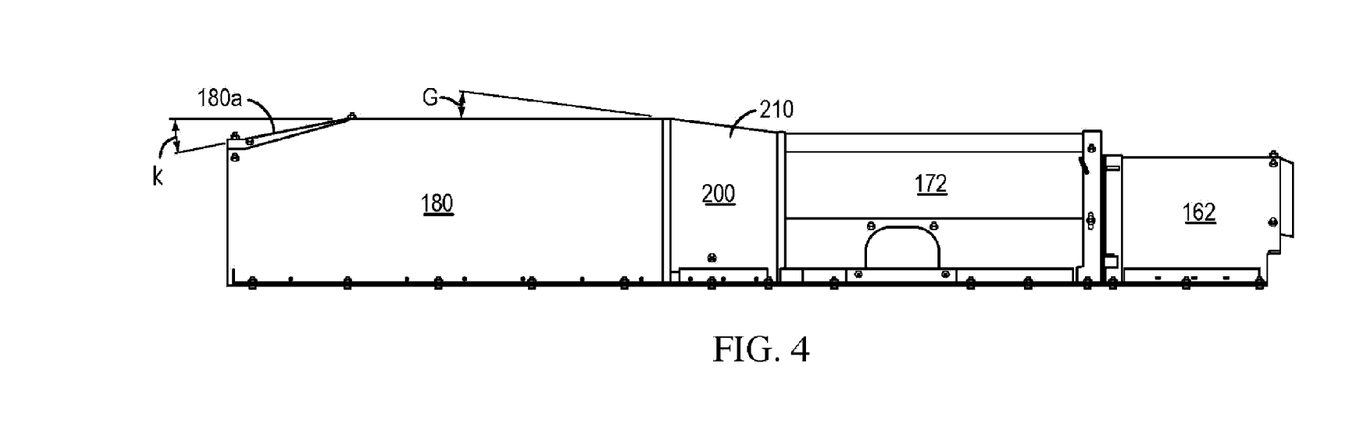
FIG. 4 is a side view of the cover shown in FIG. 3.
Figure 5:
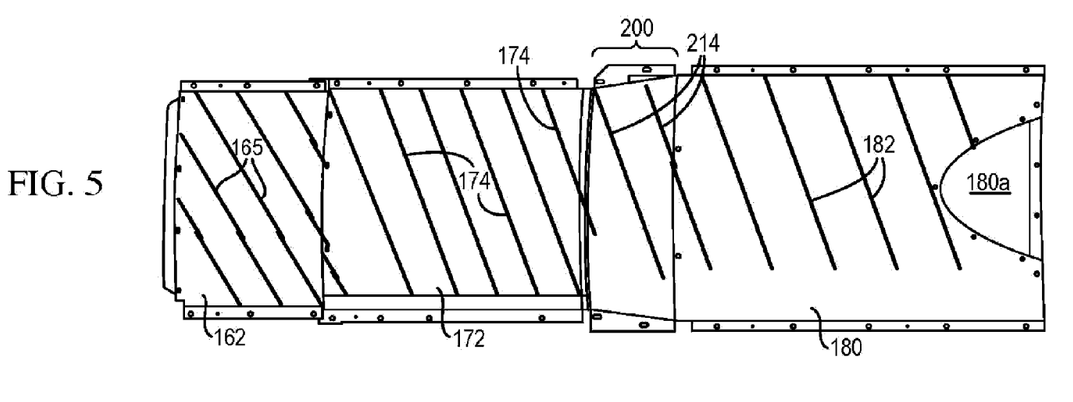
FIG. 5 is a bottom view of the cover shown in FIG. 3.
Figure 6:
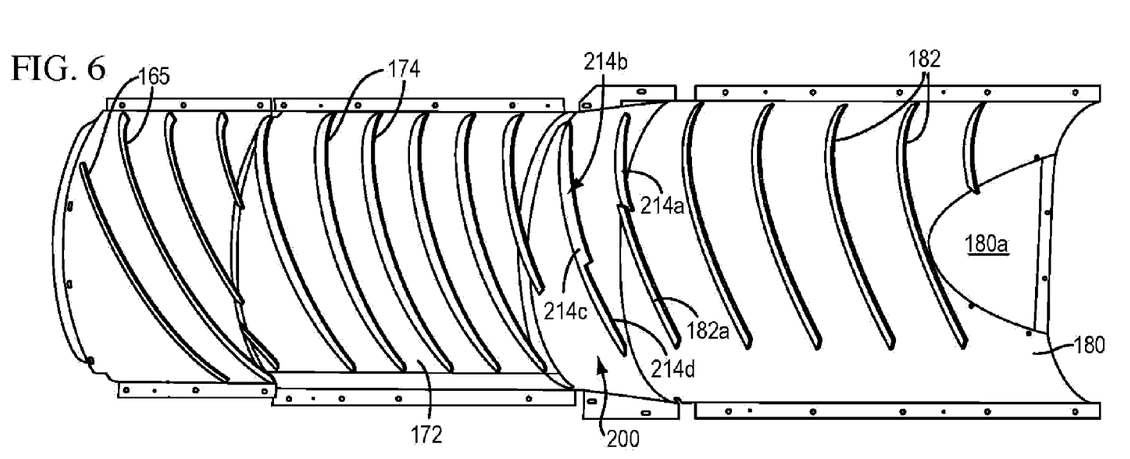
FIG. 6 is a perspective bottom view of the cover shown in FIG. 3.

The rotor 37a shown in FIG. 2A is substantially the same rotor in U.S. Pat. No. 7,070,498. The rotor 37b shown in FIG. 2B such as shown U.S. Pat. No. 5,688,170. As can be seen in these diagrammatic side views of FIGS. 2, 2A and 2B, the transition section 200 of the housing 36 allows for a smooth flow transition and a gradually increasing radial distance "D" between the top of the housing cover 210 and the rotor axis from the inlet of the transition section 200 to the outlet of the transition section 200. Also, for FIGS. 2A and 2B there is a gap "P", taken between the rotor and the top of the housing cover 210 from the inlet to the outlet of the transition section 200 that gradually increases within the threshing section and within the separating section.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A threshing and separating mechanism for a combine having a supporting structure, the mechanism comprising:
    an elongated rotor mounted in the supporting structure for rotation about a rotor axis, the rotor having a threshing portion and a separating portion; an elongated, substantially solid housing mounted in the supporting structure, the housing having a threshing section and a separating section, the housing surrounding the rotor and being spaced from the rotor to form an annular space between the rotor and the housing for crop material to flow through in a crop flow direction from an inlet end of the housing to an outlet end of the housing, the threshing portion of the rotor corresponding to the threshing section of the housing and the separating portion of the rotor corresponding to the separating section of the housing;
    the housing having a top that is raised above the rotor to define a first distance between the top of the threshing section of the housing and the rotor axis, and a second distance between the top of the separating section of the housing and the rotor axis; and
    the housing having a substantially solid transition section between the threshing section and the separating section of the housing, and arranged over an outlet portion of the threshing portion of the rotor and an inlet portion of the separating portion of the rotor, the top of the housing being raised above the rotor at an inlet end of the transition section to define a third distance between the top of the transition section and the rotor axis, said top of the housing being raised above the rotor at an outlet end of said transition section to define a fourth distance between the top of the transition section and the rotor axis, said third distance substantially equal to said first distance and said fourth distance substantially equal to said second distance, wherein the transition section of the housing expands at an oblique angle from the inlet end of the transition section to the outlet end of the transition section, and wherein the transition section overlaps each of the threshing portion and the separating portion.

2. The threshing and separating mechanism of claim 1, wherein the housing is generally circular in a radial section.

3. The threshing and separating mechanism of claim 2, wherein the rotor is generally cylindrical, the threshing portion of the rotor having a threshing diameter and the separating portion of the rotor having a separating diameter, the threshing and separating diameters being unequal.

4. The threshing and separating mechanism of claim 3, wherein the separating diameter is larger than the threshing diameter.

5. The threshing and separating mechanism of claim 4, wherein the transition section of the housing, when viewed in a vertical section along the housing axis, is frusto-conical and the distance between rotor axis and the top of the housing continuously increases in the crop flow direction from the threshing section to the separating section.

6. The threshing and separating mechanism of claim 5, wherein the housing has an inlet section which is generally cylindrical and located in front of the threshing section in the crop flow direction.

7. The threshing and separating mechanism of claim 1, wherein the rotor comprises a tube, that when viewed in a vertical section along the housing axis, is frusto-conical within the threshing section.

8. The threshing and separating mechanism of claim 7, wherein the housing has an inlet section which is generally cylindrical and located in front of the threshing section in the crop flow direction.

9. An axial flow combine for harvesting, threshing and separating crop material comprising:
a supporting structure;
ground engaging means extending from the supporting structure for transporting the supporting structure around a field;
a substantially solid rotor housing located inside the support structure, the rotor housing is provided with a threshing section in which crop material is threshed and a separating section in which threshed grain is separated from threshed crop material, the threshing section defining a threshing axis and the separating section defining a separating axis;
a rotor located in the rotor housing having a rotor axis, the rotor is provided with crop engaging assemblies for engaging crop material passing through the rotor housing, whereby the threshing section of the rotor housing is arranged so that the threshing axis has a first eccentricity with respect to the rotor axis and the separating section of the rotor housing is arranged so that the separating axis has a second eccentricity with respect to the rotor axis, said first eccentricity less than said second eccentricity;
a substantially solid, frusto-conical transition section connecting the threshing section of the rotor housing to the separating section of the rotor housing, wherein the transition section overlaps each of the threshing portion and the separating portion, and
wherein the transition section expands at an oblique angle from an inlet end of the transition section to an outlet end of the transition section.

10. The combine of claim 9, wherein the rotor housing is arranged so that the separating axis is located parallel to and above the rotor axis.

11. The combine of claim 9, wherein the housing separating section includes a separating grate.

12. The combine of claim 9, and including a plurality of generally helical vanes mounted on the transition section of the housing and extending into the space between the rotor and the transition section to engage crop material therein and direct it in a rearward spiral.

13. A threshing and separating mechanism for a combine having a supporting structure, the mechanism comprising:
an elongated rotor mounted in the supporting structure for rotation about a rotor axis, the rotor having a threshing portion and a separating portion; an elongated, substantially solid housing mounted in the supporting structure, the housing having a threshing section and a separating section, the housing surrounding the rotor and being spaced from the rotor to form an annular space between the rotor and the housing for crop material to flow through in a crop flow direction from an inlet end of the housing to an outlet end of the housing, the threshing portion of the rotor corresponding to the threshing section of the housing and the separating portion of the rotor corresponding to the separating section of the housing;
the housing having a top that is raised above the rotor to define a first gap between the threshing portion of the rotor and the top of the threshing section of the housing, and a second gap between the separating portion of the rotor and the separating section of the housing; and
the housing having a substantially solid transition section between the threshing section and the separating section of the housing, and arranged over an outlet portion of the threshing portion of the rotor and an inlet portion of the separating portion of the rotor, the top of the housing being raised above the rotor at an inlet end of the transition section to define a third gap between the rotor and the top of the transition section, said top of the housing being raised above the rotor at an outlet end of said transition section to define a fourth gap between the rotor and the top of the transition section, said third gap substantially equal to said first gap and said fourth gap substantially equal to said second gap, wherein the transition section of the housing expands at an oblique angle from the inlet end of the transition section to the outlet end of the transition section, and wherein the transition section overlaps each of the threshing portion and the separating portion.

14. The threshing and separating mechanism of claim 13, wherein the housing is generally circular in a radial section.

15. The threshing and separating mechanism of claim 14, wherein the rotor is generally cylindrical, the threshing portion of the rotor having a threshing diameter and the separating portion of the rotor having a separating diameter, the threshing and separating diameters being unequal.

16. The threshing and separating mechanism of claim 15, wherein the separating diameter is larger than the threshing diameter.

17. The threshing and separating mechanism of claim 16, wherein the transition section of the housing, when viewed in a vertical section along the housing axis, is frusto-conical and the gap between the rotor and the top of the housing continuously increases in the crop flow direction within the threshing section and within the separating section.

18. The threshing and separating mechanism of claim 17, wherein the housing has an inlet section which is generally cylindrical and located in front of the threshing section in the crop flow direction.

19. The threshing and separating mechanism of claim 13 wherein the rotor comprises a tube, that when viewed in a vertical section along the housing axis, is frusto-conical within the threshing section.

20. The threshing and separating mechanism of claim 19, wherein the housing has an inlet section which is generally cylindrical and located in front of the threshing section in the crop flow direction.

* * * * *